United States Patent
Patel et al.

(10) Patent No.: US 8,062,476 B2
(45) Date of Patent: Nov. 22, 2011

(54) HIGH STRENGTH PAPER AND PROCESS OF MANUFACTURE

(75) Inventors: Shilpan Pravinchandra Patel, Maharashtra (IN); Nikita Kamlesh Thanawala, Maharashtra (IN)

(73) Assignee: Arrow Coated Products Ltd., Mumbai (IN)

( * ) Notice: Subject to any disclaimer, the term of this patent is extended or adjusted under 35 U.S.C. 154(b) by 955 days.

(21) Appl. No.: 11/887,132

(22) PCT Filed: Mar. 22, 2006

(86) PCT No.: PCT/IN2006/000099
§ 371 (c)(1), (2), (4) Date: Sep. 24, 2007

(87) PCT Pub. No.: WO2006/120700
PCT Pub. Date: Nov. 16, 2006

(65) Prior Publication Data
US 2010/0175842 A1 Jul. 15, 2010

(30) Foreign Application Priority Data
Mar. 22, 2005 (IN) .......................... 311/MUM/2005

(51) Int. Cl.
*D21H 21/18* (2006.01)
*D21H 21/52* (2006.01)
(52) U.S. Cl. .................. 162/164.1; 162/168.1; 162/183; 162/184; 162/186
(58) Field of Classification Search .................. 162/103, 162/104, 108, 140, 168.1, 175, 177, 178; 428/311.31, 311.71, 317.7, 332, 337, 537
See application file for complete search history.

(56) References Cited

U.S. PATENT DOCUMENTS

| | | | | |
|---|---|---|---|---|
| 1,459,259 A * | 6/1923 | Richardson | ................... | 162/108 |
| 1,861,044 A * | 5/1932 | Ballard | ................... | 162/108 |
| 1,921,504 A * | 8/1933 | Chase et al. | ................... | 162/108 |
| 2,402,469 A * | 6/1946 | Toland et al. | ................... | 162/168.1 |
| 2,917,506 A * | 12/1959 | Caldwell et al. | ................... | 536/50 |
| 3,294,618 A | 12/1966 | Busche et al. | | |
| 3,867,252 A * | 2/1975 | Skrabak et al. | ................... | 162/268 |

(Continued)

FOREIGN PATENT DOCUMENTS
GB 1 185 227 3/1970
(Continued)

*Primary Examiner* — Eric Hug
*Assistant Examiner* — Peter Chin
(74) *Attorney, Agent, or Firm* — Polster, Lieder, Woodruff & Lucchesi, L.C.

(57) ABSTRACT

A preparation of high strength paper by incorporating a polymeric film into the paper web during the paper making process is provided. The polymeric film is either a cold water soluble film or hot water soluble film or water insoluble hydrophilic film or non soluble non hydrophilic film or a combination of cold+hot+cold water soluble film or cold+hot water soluble film or cold+non soluble hydrophilic film or cold+non soluble hydrophilic film+cold water soluble film or cold+non soluble non hydrophilic film or cold+non soluble non hydrophilic film+cold water soluble film or slit strips of one or many of these combinations woven or intertwined offline and incorporated into the paper during the paper making process. Zone coating or discreet printing or zone extrusion striping or formation of hot water soluble film on preformed cold water soluble film which is then inserted into paper during the paper making process, thus using cold water soluble film as a carrier is also provided. The combination of the water soluble film(s) may be plain or wholly or partially perforated.

24 Claims, 2 Drawing Sheets

U.S. PATENT DOCUMENTS

| | | | |
|---|---|---|---|
| 3,880,706 A * | 4/1975 | Williams | 162/103 |
| 4,462,867 A * | 7/1984 | Fuller | 162/103 |
| 4,552,617 A * | 11/1985 | Crane | 162/103 |
| 4,692,211 A | 9/1987 | Roberts | |
| 4,865,691 A * | 9/1989 | White | 162/168.1 |
| 5,694,702 A | 12/1997 | Anderson | |
| 5,786,064 A | 7/1998 | Finestone et al. | |
| 5,958,180 A | 9/1999 | Hubbe et al. | |
| 5,993,953 A | 11/1999 | Takahashi et al. | |
| 6,022,447 A * | 2/2000 | Radwanski et al. | 162/115 |
| 2002/0108906 A1 | 8/2002 | Husain et al. | |

FOREIGN PATENT DOCUMENTS

| | | |
|---|---|---|
| WO | WO 01/57311 | 8/2001 |
| WO | WO 2006/066461 | 6/2006 |

* cited by examiner

HIGH STRENGTH PAPER AND PROCESS OF MANUFACTURE

CROSS-REFERENCE TO RELATED APPLICATIONS

This application is a National Stage application of International Application No. PCT/IN2006/000099, filed on Mar. 22, 2006, which claims priority of Indian application number 311/MUM/2005, filed on Mar. 22, 2005.

BACKGROUND OF THE INVENTION

1. Field of Invention

This invention relates to high strength paper and to the process manufacturing high strength paper.

2. Description of the Prior Art

Various types of paper, with or without lamination, to achieve enhanced strength, texture, and functionality are known.

For example U.S. Pat. No. 5,993,953 describes a laminated paper, including a water soluble polyvinyl alcohol layer, having selective air permeability and lengthwise softness for application as a cushioning material. The laminated paper comprises a paper base, and water soluble PVA laminated over the entire surface of the paper base, either by using a PVA strain adhesive or by extrusion lamination using a cold water soluble plastic PVA resin.

U.S. Pat. No. 5,958,180 discloses a method of increasing the strength of paper or paperboard product by specially treating the cellulosic fibers to significantly increase their inter fiber bonding strength. The paper made from such fibers exhibits overall improved dimensional stability. Such processes are elaborate and require intricate process steps making them expensive. The use of external adhesive and offline lamination method renders these papers as an expensive proposition.

U.S. Pat. No. 5,786,064 describes an apparatus for producing a breathable high strength paper/plastic film laminate fabric sheeting capable of being cut, sewn to manufacture garments. In this apparatus, a web of metallised paper and a web of oriented synthetic plastic film whose inner surface is corona discharge treated before being coated with a water based adhesive are concurrently fed in superposed relating into combining rolls to effect cold lamination of the webs to yield a laminate sheeting in which the orientation of the film web is unimpaired. The laminate sheeting emerging from the combination rolls is then foraminated to render the sheeting permeable only to moisture vapour, whereby the foraminated sheeting has fabric properties and can be tailored to garments.

U.S. Pat. No. 4,692,211 describes a process for the preparation of high strength cellulosic gel containing kraft paper by mechanically refining kraft papermaking pulp to an appropriate freeness, mixing the resulting refined pulp with hydrated cellulosic gel binder running the resulting fluid into a felted sheet and pressing and drying the sheet to form the kraft paper product.

U.S. Pat. No. 5,694,702 teaches the art of enhancing cross-directional stretch and tensile energy absorption during paper manufacture. An unrestrained drying capability is added to an existing series of rotating drying cylinders in a cost and space efficient manner to achieve the desired result.

It is clear from the existing prior art that the methods for strengthening paper are complex involving the use of selective adhesives, extrusion lamination, fiber strengthening, coating using cold lamination, laminate sheeting followed by its formation, mechanically refining kraft paper pulp followed by mixing of hydrated cellulosic gel binder and enhancing cross directional stretch by unrestrained drying etc.

The long felt need of the paper industry especially involving manufacturing of bank note papers, paper based security products, packaging require non tamperable high strength paper that is capable of being processed by diverse means. None of the methods described in the prior art or in current practice are capable of making paper of the desired strength and security parameters in a simple and cost effective manner.

The present invention has been made from a consideration of the foregoing and seeks to provide a high strength paper and method of manufacturing such paper that overcome or mitigates at least some of the problems of the prior art.

SUMMARY OF THE PRESENT INVENTION

According to a first aspect of the invention, a method of making a high strength paper by incorporating a polymeric film into the paper web during the paper making process is provided.

As used hereinafter in the description and claims, the following terms shall have the defined meaning.

WSF (water soluble film): By definition shall mean Water Soluble film(s) of all types. WSF can be manufactured by a process of direct casting on a conveyor, by casting on a detachable liner, by casting from a T-die casting, by blowing film on extrusion machines, or by extrusion via T-die extrusion. The formulation of the WSF shall determine the temperature of water in which the WSF shall easily dissolve. This range of water temperature varies between 5° C. to 100° C. For the purpose of this invention, it is clarified that WSF encompass all types of WSF made from any of the above methods, including direct coating of WSF film forming resins.

For the purpose of this invention, it is clarified that CWSF means cold water soluble film, which becomes tacky, breaks and finally dissolves in a temperature ranging from 5° C. to 40° C., preferably from 10° C. to 40° C., more preferably from 20° C. to 40° C. The time of tack, break and dissolution of the CWSF shall range between 1 second to 3 minutes upon contact with water/water pulp slurry. However, this shall depend upon the CWSF formulation.

Similarly, for the purpose of this invention, it is clarified that HWSF means hot water soluble film, which shall become tacky, break and finally dissolve in a temperature ranging from 40° C. to 100° C., preferably from 45° C. to 90° C., more preferably from 50° C. to 85° C. The time of tack, break and dissolution of the HWSF shall range between 5 seconds to 5 minutes upon contact with hot water/water pulp slurry. However, this shall depend upon the HWSF formulation.

Similarly, for the purpose of this invention, it is clarified that NSHF means non soluble hydrophilic film, which shall become tacky and may break/crack at certain places but shall not dissolve on contact with water/water pulp slurry. The tack and break time shall range between 7 seconds to 10 minutes, which can depend upon the formulation of the non soluble hydrophilic film and the temperature of water.

The water soluble films mentioned in this invention are made from materials selected from various film forming resins, such as polyvinyl alcohol copolymer ionomers, polyvinyl alcohol homopolymer, non-ionomeric poly vinyl alcohol polymer, polymethacrylate, polyvinyl alcohol, polyacrylamide, polymethacrylamide, polyacrylic acid, polymethacrylic acid, polyurethane, polyethyleneglycol, polyvinylpyrrolidone, proteinaceous binders such as gelatin, modified gelatins such as phthaloyl gelatin, polysaccharides such as starch, gum Arabic, pullulan and dextrin and water soluble cellulose derivatives or combination thereof. The cellulose derivatives used are methyl cellulose, hydroxy propyl cellulose, hydroxy propyl methyl cellulose, hydroxy propyl ethyl cellulose, hydroxy ethyl cellulose, carboxy methyl cellulose. However, these are by no means limiting.

Addition and inclusion of certain additives, such as ammonium chloride and other such alkaline chemicals will render the film to be non soluble hydrophilic film.

NSNHF: This is a non soluble non hydrophilic type of film. This type of film is readily available in the market and can be selected from PP (Poly propylene), PE (Poly ethylene), LDPE (Low density poly ethylene), HDPE (high density polyethylene), LLDPE (Linear low density polyethylene), HIPS (High impact polystyrene), HMHDPE (High molecular high density polyethylene), BOPP (Biaxially oriented poly propylene). However, these are by no means limiting.

This non soluble non hydrophilic film can also be made out of biodegradable materials such as PLA (Poly Lactic Acid), PHA (polyhydroxyalkanoic acid), thermoplastic starch materials or biodegradable polyesters such as ecoflex.

NSNHF is necessarily combined with a layer of CWSF polymer on one or both sides, depending upon its end use.

Film combinations: The films used for increasing the strength of the paper may be a cold or hot water soluble film or non soluble hydrophilic film or non soluble non hydrophilic film or a combination of these films as mentioned below:

1. CWSF+HWSF: This is a combination of cold and hot water soluble films wherein the cold/hot water soluble is cast/coated/laminated onto the hot/cold water soluble film.
2. CWSF+HWSF+CWSF: This is a combination of water soluble films wherein the hot water soluble film will be between two cold water soluble films.
3. CWSF+NSHF: This is a combination of cold water soluble and non soluble hydrophilic films wherein the NSHF/CWSF is cast/coated/laminated on the CWSF/NSHF film.
4. CWSF+NSHF+CWSF: This is a combination of cold water soluble/non soluble hydrophilic/cold water soluble films wherein the NSHF will be between two cold water soluble films.
5. CWSF+NSNHF: This is a combination of cold water soluble and non soluble non hydrophilic film wherein the NSNHF/CWSF is cast/coated/laminated on the CWSF/NSNHF film.
6. CWSF+NSNHF+CWSF: This is a combination of cold water soluble/non soluble non hydrophilic/cold water soluble films wherein the NSNHF will be between two cold water soluble films.
7. Machine direction strips matrix: Strips of polymeric film inserted/cast/coated onto another polymeric film. This combination can be formed by zone coating or discreet printing or zone extrusion striping or formation of a film on another polymeric film which is then inserted into paper during the paper making process.
8. Woven tape matrix: Strips of polymeric film or PVA threads woven by a warp and weft method. Here the polymeric films or its combinations as described before, are slit into microtapes having a width in the range of 3 mm to 15 mm, preferably 4 mm to 10 mm, more preferably 5 mm to 7 mm. However, this range is by no means limiting. The size of the PVA threads ranges from 50 deniers to 1000 deniers, preferably 150 deniers to 700 deniers, more preferably from 300 deniers to 500 deniers. However, this range is by no means limiting.

These tapes or threads are woven offline into a warp and weft, as can be seen in a fabric making machine, and a continuous matrix is made in a roll form. These tapes can be inserted into a pulp-paper web in a combination of MD (machine direction) and CD (cross direction).

9. Films With Perforations: Any of the above mentioned films or combination of films could be perforated at random places, discreet places or all over. These perforations can be done by various methods, such as hot needles, mechanical/needle covered rollers, pneumatic/mechanical perforation machines etc. However, these methods are by no means limiting.

Paper pulp: The paper pulp used for manufacturing this high strength paper is selected from a mixture of fibers of hardwood and softwood, cotton fibres such as cotton linters and cotton rags, linen, flax, jute, hemp, kozo, mitsumata, gampi, grass fibres such as esparto, bamboo, giant nettle, rice straw and rattan; and wood pulp. However, these are by no means limiting.

The polymeric film may be a cold water soluble film or hot water soluble film or water insoluble hydrophilic film or water insoluble non hydrophilic film or a combination of cold+hot+cold water soluble film or cold+hot water soluble film or cold+non soluble hydrophilic film or cold+non soluble hydrophilic+cold water soluble film or cold+non soluble non hydrophilic film or cold+non soluble non hydrophilic+cold water soluble film or slit strips of polymeric films or PVA threads woven or intertwined offline or strips of polymeric film inserted/cast/coated onto another polymeric film and incorporated into the paper during the paper making process.

The term "polymeric film" is to be construed accordingly to include all of these for the purpose of this invention.

The strength of the paper will depend upon the type of film or combination of different types of polymeric films incorporated into the pulp bed and the thickness of the films. For example, a paper incorporated with CWSF having a thickness of 25 microns will have lesser strength than a paper incorporated with a C—H combination having a thickness of 25 microns and this has been proved by the experiments as described later.

Similarly, the NSHF or its combination will have more strength than, for example, a C—H combination, while NSNHF shall have better strength than NSHF.

Also, as the thickness of the film increases, the strength of the paper will increase. The thickness of the film or its combinations ranges from 5 microns to 150 microns, preferably from 10 microns 70 microns, more preferably from 15 microns to 35 microns.

If the film is a cold water soluble film, it may dissolve during the paper making process and be absorbed into the fibres of the paper web. Alternatively, the water soluble film may remain intact and adhere to the paper web. Alternatively, the water soluble film may comprise a combination of at least one film that dissolves and at least one film that remains intact.

The preformed film may be plain or perforated wholly, partially or randomly.

In one of the embodiments of the invention, the paper is strengthened by inserting a combination of cold and hot water soluble films during the paper making process. Hence, while the combined film is incorporated into the pulp fibres, the cold water soluble film will solubilise within the pulp fibres, while the hot water soluble film will remain intact due to the differential temperature of pulp-water slurry, thereby strengthening the paper.

In yet another embodiment of the invention, the paper is strengthened by inserting a cold water soluble film during the paper making process. The cold water soluble film will solubilise into the pulp fibres and hence strengthen the paper.

In yet another embodiment of the invention, the paper is strengthened by inserting a hot water soluble film, optionally perforated selectively during the paper making process. The hot water soluble film will not solubilise into the pulp fibres due to the differential temperature of pulp-water slurry and hence strengthen the paper.

In yet another embodiment of the invention, the paper is strengthened by inserting a water insoluble hydrophilic film made from mixing an alkaline material into the hot water or cold water soluble film batch mix instead of the water soluble film(s) mentioned in the above embodiments. This film, which is optionally perforated selectively, will not dissolve into the pulp fibres but will become tacky due to its hydrophilic nature and shall adhere to the partially formed bed of pulp. Hence, the film will remain intact and thus give added strength to the final product. This film can be used particularly when the water-pulp slurry temperature is a little higher.

In yet another embodiment of the invention, the paper is strengthened by inserting a non soluble, non hydrophilic perforated film, which is optionally perforated selectively, during the paper making process. The film will not dissolve into the pulp fibres and remain intact inside the paper web, hence increasing the strength of the paper.

In yet another embodiment of the invention, the paper is strengthened by inserting a combination of cold and hot and cold water soluble films. The hot water soluble film used here can be optionally perforated selectively. The cold water soluble films will solubilise into the pulp fibres while the hot water soluble film will remain intact due to the differential temperature of pulp-water slurry, thus strengthening the paper.

In yet another embodiment of the invention, the paper is strengthened by inserting a combination of cold water soluble film and non soluble hydrophilic film, to strengthen the paper. The non soluble hydrophilic film used here can be optionally perforated selectively. The cold water soluble film will solubilise into the pulp fibres while the non water soluble hydrophilic film will not dissolve into the pulp fibres but will become tacky due to its hydrophilic nature and shall adhere to the partially formed bed of pulp. Hence, the film will remain intact and thus give added strength to the final product. This film can be used particularly when the water-pulp slurry temperature is a little higher.

In yet another embodiment of the invention, the paper is strengthened by inserting a combination of cold water soluble film+non soluble hydrophilic film+cold water soluble film, to strengthen the paper. The non soluble hydrophilic film used here can be optionally perforated selectively. The cold water soluble films will solubilise into the pulp fibres while the non water soluble hydrophilic film will not dissolve into the pulp fibres but will become tacky due to its hydrophilic nature and shall adhere to the partially formed bed of pulp. Hence, the film will remain intact and thus give added strength to the final product. This film can be used particularly when the water-pulp slurry temperature is a little higher.

In yet another embodiment of the invention, the paper is strengthened by inserting a combination of cold water soluble film and non soluble non hydrophilic film. The non soluble non hydrophilic film used here can be optionally perforated selectively. The cold water soluble film will solubilise into the pulp fibres while the non water soluble non hydrophilic film will not dissolve into the pulp fibres and will remain intact and thus give added strength to the final product. This film can be used particularly when the water-pulp slurry temperature is a little higher.

In yet another embodiment of the invention, the paper is strengthened by inserting a combination of cold water soluble film+non soluble non hydrophilic film+cold water soluble film, to strengthen the paper. The non soluble non hydrophilic film used here can be optionally perforated selectively. The cold water soluble films will solubilise into the pulp fibres while the non water soluble non hydrophilic film will not dissolve into the pulp fibres and will remain intact and thus give added strength to the final product. This film can be used particularly when the water-pulp slurry temperature is a little higher.

In yet another embodiment of the invention, the paper is strengthened by inserting a combination of polymeric films including strips of films wherein the strips are inserted/cast/coated onto another film, to deliver security features that are embedded/printed within/on the film strips.

For example, strips of HWSF consisting security features are inserted/cast/coated on a cold water soluble film. The cold water soluble film will solubilise into the pulp fibres increasing the strength of the paper while the hot water soluble film with security features will remain intact due to the differential temperature of pulp-water slurry, thus solving the problem of micro-text words or logos floating within the matrix of the paper pulp which may happen while using only CWSF, or strips of CWSF.

In yet another embodiment of the invention, the paper is strengthened by inserting a matrix of strips of polymeric films or PVA threads inter-woven by a warp and weft method. The strips may be formed from a combination of different types of films. The hot water soluble film or non soluble hydrophilic film or non soluble non hydrophilic film used here can be optionally perforated selectively. The cold water soluble strips will solubilise into the pulp fibres while the HWSH/NSHF/NSNHF strips will remain intact and hence strengthen the paper.

According to a second aspect, the present invention provides paper made by the method according to the first aspect of the invention.

BRIEF DESCRIPTION OF THE DRAWINGS

Embodiments of the invention will now be described in more detail, by way of example with reference to the accompanying drawings, wherein.

DETAILED DESCRIPTION OF THE PRESENT INVENTION

Figure 1:
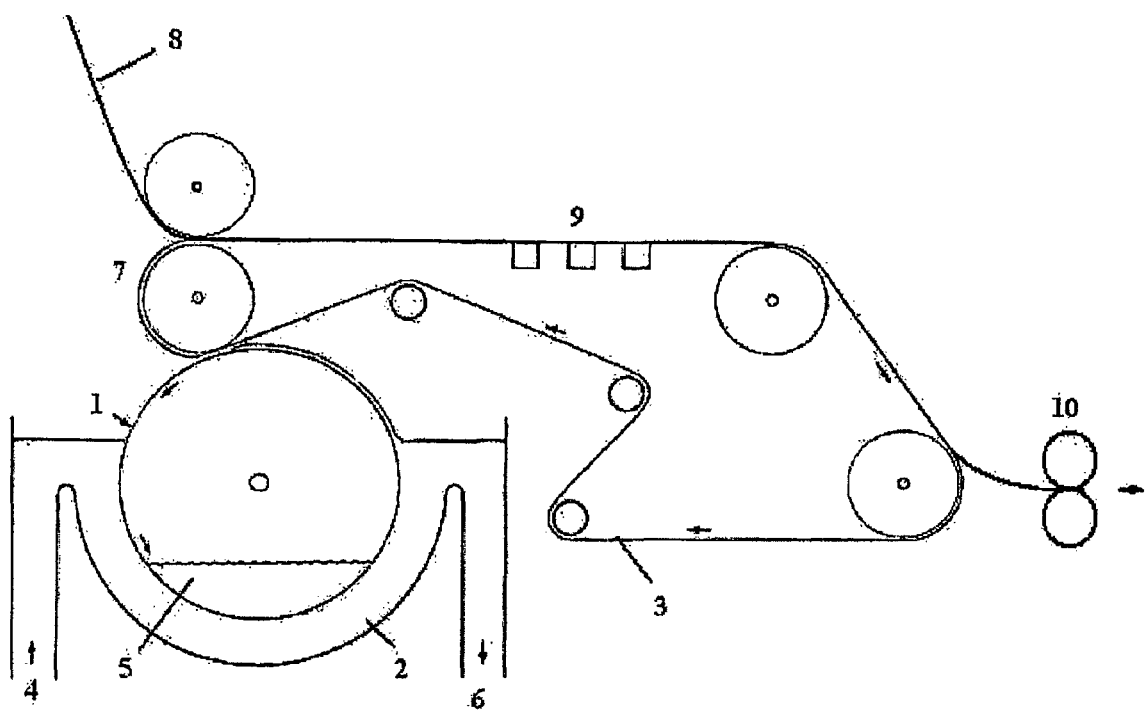
FIG. 1 shows a first process for manufacturing high strength paper according to the invention.

Referring to FIG. 1, the process of incorporating a polymeric film into the paper during the paper making process by the cylinder mould method is as follows:
1. Filling the vat (2) with the pulp-water slurry entering at (4), the pulp content ranging from 5 to 7%.
2. Formation of the paper body on the outside of the rotating cylinder (1) covered with a wire cloth. As the cylinder rotates, water is removed from the inside of the cylinder and a layer of fibres is formed on the outside. This is consolidated by a couch roll (7), which squeezes more water away. The couch roll 7 also peels the wet paper cleanly off the cylinder mould and transfers it to the continuous moving belt (3).

3. Layering of a preformed polymeric film (8) onto the pulp fiber bed at the couch roll 7 as shown in the figure.
4. Passing the construction through the vacuum boxes (9) to remove excess water from the pulp bed. The fiber content in the pulp increases to 30 to 40%.
5. Passing the construction through a press roll (10) to remove excess water.
6. Sending the construction to dryers for further evaporating the moisture from the paper web.

Similarly, the polymeric film can also be incorporated during the fourdrinier process of paper making.

During step 3, if the film is a CWSF, then the film will start dissolving as soon as it comes in contact with the pulp bed and will be sucked into the paper when it passes through vacuum boxes.

If the film is a HWSF or NSHF or NSNHF or any of the combination having at least one layer or strip of HWSF/NSHF/NSNHF, then the film will not dissolve and will stay on the surface of the pulp bed due to the lower capacity of the vacuum suction box. Hence, if a HWSF or NSHF or NSNHF or any other combinations of films consisting HWSF/NSHF/NSNHF have to be incorporated into the pulp bed, a Twin former process may be required, depending upon the needs and ultimate quality of paper required.

Figure 2:
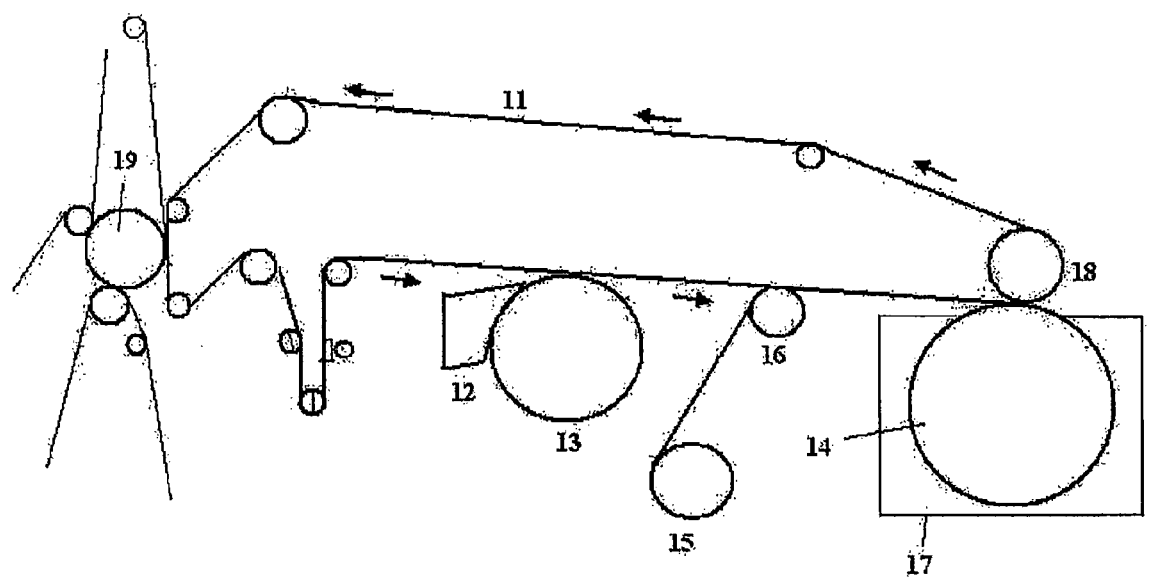
FIG. 2 shows a second process for manufacturing high strength paper according to the invention.

As shown in FIG. 2, a first ply of wet paper is formed as the water-pulp slurry coming from the stock approach box (12) is dropped on a continuous moving belt (11) by the first former (13). The temperature of the pulp water slurry in the stock approach box ranges 15° C. to 40° C., more preferably from 25° C. to 30° C. The concentration of the pulp fibres in the pulp-water slurry in the stock approach box 12 is 5% to 7%. The first ply of wet paper formed by the first former 13 constitutes 80% of wt/thickness of the final paper.

A film or either a combination of film as unwound from the unwinder (15), is incorporated into the first ply of the wet paper web with the help of a guide roll (16), as shown in the figure.

A second ply of wet paper is formed on the film side of the first ply of wet paper by the second former (14). The cylinder (14), covered with a wire cloth, rotates in the vat (17) containing pulp-water slurry. As the cylinder 14 rotates, water is removed from the inside of the cylinder 14, while a layer of pulp fibres is formed on the outside. This is consolidated by the couch roll (18), which squeezes more water away. The couch roll 18 also peels the wet paper cleanly off the cylinder and transfers it to the moving continuous belt, which carries it to the press section 19. The second ply of wet paper formed by the second former constitutes of 20% of wt/thickness of the final paper.

More water is removed at the press section (19), and the two ply paper is further sent to dryers for further evaporating the moisture from the paper web.

When a C—H combination of film has to be incorporated into the paper by twin former, the CWSF side of the combined film should be in contact with the first ply of wet paper. Hence, the CWSF in contact with the wet paper will start dissolving and merge with the fibres, while the HWSF will remain on the surface of the wet paper as it does not dissolve at temperatures below 55° C. Hence, a second layer of paper is formed on the HWSF side so that HWSF will not show on the surface.

Similarly, the other combinations of polymeric films can also be incorporated into the paper, with CWSF side facing the first ply of wet paper web.

The following experiments were conducted in the lab to prove the invention:

Forming Paper:
1. We got some dehydrated virgin pulp from a paper mill and cut the pulp matrix into small pieces and soaked the pieces in warm water in the large tub overnight.
2. We filled the blender halfway with warm water, then added a handful of the soaked pulp pieces. We blended the pieces until no pieces of pulp sheet were seen. This formed into the pulp-water slurry.
3. We poured the blended mixture into the large tub and then filled the tub with warm water, mixing thoroughly until the ingredients were evenly dispersed.
4. We slide a screen/sieve into the tub and allowed some pulp to settle onto the screen and while still holding the screen underwater, gently moved it back and forth to get an even layer of fibers on the screen.
5. We lifted the screen out of the slurry, keeping it flat and allowed it to drip over the tub until most of the water has drained through.
6. We dried the wet paper with the help of a hair dryer and then left it to dry for few hours to remove excess water.
7. When the paper was dry, we gently peeled it off from the screen to form a hand made paper. We weighed the paper, which was 110 GSM.
8. We tested the tensile strength of this paper as per standard D 882 on a universal testing machine (UTM).

Forming Paper Incorporated with CWSF:
1. We dipped a screen into the tub containing pulp-water slurry as formed in the above process and allowed some pulp to settle onto the screen and while still holding the screen underwater, gently moved it back and forth to get an even layer of fibers on the screen.
2. We lifted the screen out of the slurry, keeping it flat and allowed it to drip over the tub until most of the water has drained through and placed the screen on the floor.
3. We layered the top of the wet paper with 30 microns CWSF. As soon as the CWSF came in contact with wet paper, it started dissolving and after some time dissolved completely.
4. We dried the wet paper+CWSF with the help of a hair dryer and then left it to dry for few hours to remove excess water.
5. When the paper+CWSF was dry, we gently peeled it off from the screen to form a high strength paper. The thickness of this construction was 110 GSM.
6. We tested the tensile strength of this paper+CWSF as per standard D 882 on a universal testing machine (UTM).

Forming Paper Incorporated with HWSF:
1. We dipped a screen into the tub containing pulp-water slurry as formed in the above process and allowed some pulp to settle onto the screen and while still holding the screen underwater, gently moved it back and forth to get an even layer of fibers on the screen.
2. We lifted the screen out of the slurry, keeping it flat and allowed it to drip over the tub until most of the water has drained through and placed the screen on the floor.
3. We layered the top of the wet paper with 20 microns HWSF. As soon as the HWSF came in contact with wet paper, it became tacky but did not dissolve.
4. We formed another layer of wet pulp on another screen and let the water drip as explained above and we gently put this screen on top of the HWSF side of the wet paper as formed in step 3.
5. We dried the wet paper+HWSF+paper with the help of a hair dryer and then left it to dry overnight to remove excess water.

6. When the paper+HWSF+paper was dry, we gently peeled it off from the screen to form a high strength paper.
7. We tested the tensile strength of this paper+HWSF+paper as per standard D 882 on a universal testing machine (UTM).

Similarly, a C—H combination of WSF (20 microns) was incorporated into the paper as per the above process.

Care was taken that the thickness of the paper incorporated with polymeric film was kept constant.

The strength comparison of paper, paper incorporated with CWSF, paper incorporated with HWSF and paper incorporated with C—H combination of WSF is shown table 1:

| Mech. Props. | Tensile Strength $Kg/cm^2$ | % Elongation % | Peak Load Kg |
|---|---|---|---|
| Paper (110 GSM) | 66.53 | 2.1 | 1.82 |
| Paper incorporated with CWSF (110 GSM) | 135.05 | 5.56 | 4.33 |
| Paper incorporated with HWSF (110 GSM) | 97.67 | 4.15 | 2.686 |
| Paper incorporated with C—H combination (110 GSM) | 122.07 | 5.7 | 3.357 |

As will be appreciated, the present invention provides a process for making paper that is strengthened by the incorporation of a film during the manufacturing process. The film may be electively soluble at temperatures above or below the temperature of the water contained in the paper substrate to which it is applied during the process or it may be non soluble. In this way, the manner in which the film is incorporated into the finished paper can be controlled. For example, the cold water soluble film will dissolve in the pulp bed and a hot water soluble film will remain intact and combinations of films which may dissolve or remain intact or combinations of any of these films may be employed.

For the purpose of this specification, "a polymeric article" is regarded as comprising an article of matter made from a polymer in the form of a polymeric film, polymeric film strips inserted/cast/coated on a polymeric film, polymeric strips inter-woven into a matrix by warp and weft method, polymeric threads inter-woven into a matrix by warp and weft method and the like and combinations thereof.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

The invention claimed is:

1. A method of making a high strength paper by incorporating a polymeric film into the paper web during the paper making process, the method including the steps of providing a polymeric film soluble in water having a temperature ranging from 5° C. to 40° C., and applying said polymeric film to a wet paper pulp web such that said polymeric film dissolves and is absorbed into pulp fibers of said wet paper pulp web throughout said wet paper pulp web.

2. The method according to claim 1 further comprising the step of applying a second water soluble film to said wet paper pulp web, said second water soluble film being soluble in water having a temperature ranging from 40° C. to 100° C. such that said second water soluble film remains intact and adheres to the web.

3. The method according to claim 1 further comprising the step of applying a non-soluble hydrophilic film to said wet paper pulp web such that said non-soluble hydrophilic film remains intact and adheres to the web.

4. The method according to claim 1 further comprising the step of applying a non-soluble non-hydrophilic film to said wet paper pulp web such that said non-soluble non-hydrophilic film remains intact in the web.

5. The method according to claim 1 further comprising the step of applying said polymeric film with water soluble film strips soluble in water having a temperature ranging from 40° C. to 100° C. or non soluble hydrophilic film strips or vice versa.

6. The method according to claim 1 wherein said polymeric film is in the form of a matrix wherein one or more polymeric films or PVA threads are inter-woven into a matrix by warp and weft method.

7. The method according to claim 6 wherein a width/size of said film strips range from 3 mm to 15 mm.

8. The method according to claim 6 wherein a width/size of said film strips range from 4 mm to 10 mm.

9. The method according to claim 6 wherein a width/size of said film strips range from 5 mm to 7 mm.

10. The method according to claim 6 wherein a size of said PVA thread ranges from 50 deniers to 1000 deniers.

11. The method according to claim 6 wherein a size of said PVA thread ranges from 150 deniers to 700 deniers.

12. The method according to claim 6 wherein a size of said PVA thread ranges from 300 deniers to 500 deniers.

13. The method according to claim 1, wherein said polymeric film is applied to said wet paper pulp web during a cylinder mould process of paper making comprising the following steps:
   a. filling a vat with a pulp-water slurry;
   b. forming a paper web on the outside of a rotating cylinder covered with a wire cloth;
   c. layering said polymeric film onto the paper web at a couch roll;
   d. passing the construction through at least one vacuum box to remove excess water from the paper web; and
   e. passing the construction through at least one press roll to remove excess water and then to at least one dryer for further evaporating moisture from the paper web.

14. The method according to claim 1, wherein said polymeric film is applied to the wet paper pulp web during a twin former process of paper making comprising the following steps:
   a. forming a first ply of wet paper web by a first former on a continuous moving belt;
   b. incorporating said polymeric film into the first ply of the wet paper web with the help of a guide roll;
   c. forming a second ply of wet paper web on the polymeric film side of the first ply of wet paper web by a second former;
   d. passing the construction through a press section to remove excess water and then to dryers for further evaporating moisture from the paper web.

15. The method according to claim 14 wherein said polymeric film dissolves and is absorbed into pulp fibers of said first and/or second webs.

16. The method according to claim 14 wherein said polymeric film comprises a combination of at least two films wherein at least one film is a water soluble film and at least one further film is water insoluble.

17. The method according to claim 1 wherein said polymeric film is perforated.

18. The method according to claim 1 wherein said polymeric film is formed from materials selected from the group comprising polyvinyl alcohol copolymer ionomers, polyvinyl alcohol homopolymer, non-ionomeric poly vinyl alcohol polymer, polymethacrylate, polyvinyl alcohol, polyacrylamide, polymethacrylamide, polyacrylic acid, polymethacrylic acid, polyurethane and edible film forming materials like polyethyleneglycol, polyvinylpyrrolidone, proteinaceous binders such as gelatin, modified gelatins such as phthaloyl gelatin, polysaccharides such as starch, gum Arabic, pullulan and dextrin and water soluble cellulose derivatives or combinations thereof wherein said cellulose derivatives are selected from the group comprising methyl cellulose, hydroxy propyl cellulose, hydroxy propyl methyl cellulose, hydroxy propyl ethyl cellulose, hydroxy ethyl cellulose and carboxy methyl cellulose.

19. The method according to claim 4 wherein said non soluble non hydrophilic film is selected from PP (polypropylene), PE (polyethylene), LDPE (low density polyethylene), HDPE (high density polyethylene), LLDPE (Linear low density polyethylene), HIPS (High impact polystyrene), HMHDPE (High molecular high density polyethylene), BOPP (Biaxially oriented polypropylene).

20. The method according to claim 4 wherein said non-soluble non-hydrophilic film is made from biodegradable materials such as PLA (polylactic acid), PHA (polyhydroxyalkanoic acid), thermoplastic starch materials or biodegradable polyesters.

21. The method according to claim 1 wherein said polymeric film has a thickness ranging from 5 microns to 150 microns.

22. The method according to claim 1 wherein said polymeric film has a thickness ranging from 10 microns 70 microns.

23. The method according to claim 1 wherein said polymeric film has a thickness ranging from 15 microns to 35 microns.

24. The method according to claim 1 wherein said polymeric film includes security features.

* * * * *